(12) United States Patent
Furata

(10) Patent No.: US 6,866,302 B2
(45) Date of Patent: Mar. 15, 2005

(54) CONNECTING STRUCTURE FOR HOSE WITH CORRUGATED METAL TUBE

(75) Inventor: Norihiko Furata, Aichi-ken (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 0 days.

(21) Appl. No.: 10/625,308

(22) Filed: Jul. 23, 2003

(65) Prior Publication Data

US 2004/0118470 A1 Jun. 24, 2004

(30) Foreign Application Priority Data

Jul. 24, 2002 (JP) .......................... 2002-215770

(51) Int. Cl.⁷ .............................. F16L 28/00; F16L 9/14
(52) U.S. Cl. .................... 285/256; 285/903; 285/222.1; 285/222.4; 285/334.5
(58) Field of Search .................... 285/222.1, 222.4, 285/55, 334.5, 242, 251, 256, 903

(56) References Cited

U.S. PATENT DOCUMENTS

| | | | | |
|---|---|---|---|---|
| 2,026,166 A | * | 12/1935 | Guarnaschelli | 285/334.5 |
| 2,113,211 A | * | 4/1938 | Lake | 285/222.5 |
| 2,357,669 A | * | 9/1944 | Lake | 285/222.5 |
| 2,858,147 A | * | 10/1958 | Guarnaschelli | 285/222.5 |
| 3,008,737 A | * | 11/1961 | Longfellow | 285/222.5 |
| 3,844,587 A | * | 10/1974 | Fuhrmann et al. | 285/47 |
| 4,063,757 A | * | 12/1977 | Fuhrmann | 285/222.1 |
| 5,430,929 A | * | 7/1995 | Sanders | 29/507 |
| 5,498,036 A | * | 3/1996 | Kingsford | 285/123.1 |
| 5,803,511 A | * | 9/1998 | Bessette | 285/222.5 |
| 6,173,995 B1 | * | 1/2001 | Mau | 285/55 |
| 6,354,332 B1 | | 3/2002 | Burkhardt et al. | |
| 6,742,815 B2 | * | 6/2004 | Segal et al. | 285/276 |
| 2002/0007860 A1 | | 1/2002 | Katayama et al. | |
| 2004/0020545 A1 | * | 2/2004 | Takagi et al. | 138/109 |

FOREIGN PATENT DOCUMENTS

| | | |
|---|---|---|
| JP | U 51-150511 | 2/1940 |
| JP | A 2001-182872 | 7/2001 |

* cited by examiner

Primary Examiner—Eric K. Nicholson
(74) Attorney, Agent, or Firm—Andrus, Sceales, Starke & Sawall, LLP

(57) ABSTRACT

In a hose with corrugated metal tube, a connecting pipe is formed with a tapered inner surface in a tip end portion thereof a corrugated metal tube is formed with a flared portion flaring as to correspond to the tapered inner surface of the connecting pipe, and a mating pipe is formed with a tapered outer surface. The hose with corrugated metal tube is connected to the mating pipe by a cap nut so that the tapered inner space of the connecting pipe abuts the tapered outer surface of the mating pipe with the flared portion therebetween.

5 Claims, 6 Drawing Sheets

CONNECTING STRUCTURE FOR HOSE WITH CORRUGATED METAL TUBE

CROSS-REFERENCE TO RELATED APPLICATION

The present application asserts priority on Japanese Patent Application No. 2002-215770 filed Jul. 24, 2002.

BACKGROUND OF THE INVENTION

The present invention relates to a hose with corrugated metal tube, which is suitable for fuel conveying hose for automobiles, refrigerant conveying hose or any other fluid conveying hose, and more particularly to a hose connecting structure for connecting a hose with corrugated metal tube to a mating pipe.

Typical rubber hoses, for example, made of blended product of acrylonitrile-butadiene rubber and polyvinyl chloride (NBR/PVC blend) which is excellent in resistance to gasoline permeability, have been used for conveying fuel for automobiles or the like in view of their high vibration-absorbability, easy assembling or the like. However, for the purpose of global environment protection, the regulations have been recently tighten against permeation of fuel for automobiles or the like, and are anticipated to be further tighten in the future. Further, hoses are demanded to meet toe requirements to convey highly permeable fluid such as hydrogen gas used in fuel cells or carbon dioxide ($CO_2$) refrigerant.

Then it is anticipated difficult to satisfy the future requirements with hoses made only of organic materials such as rubber or resin.

Accordingly, it is currently considered to adapt a hose with a corrugated metal tube as an inner layer because the hose with corrugated metal tube is expected to have an extremely high fluid impermeability to meet the demand for a fluid impermeable hose.

As for a hose with corrugated metal tube, such hoses as disclosed in the following Document 1, Document 2 and Document 3 are known.

Document 1 JP, A, 2001-182872

Document 2 US20020007860A1

Document 3 J?, U, 51-150511

In case of the hose with corrugated metal tube, even if adapted for hydrogen gas of small molecular mass used for fuel cells, a corrugated metal tube in or as an inner layer reduces gas permeation zero, i.e., completely eliminates permeation of gas.

However, as an inner layer, i.e., a corrugated metal tube in the hose with corrugated metal tube is difficult to deform, if the hose with corrugated metal tube is adapted, it will be a problem how to construct fastening or connecting structure on an end portion of the hose with corrugated metal tube so as to assure sealing property thereon.

Up to now, as shown in FIG. 6, a hose connecting structure for an end portion of a typical rubber hose is usually constructed as in following manner. First, a rigid metal inert pipe or connecting pipe 200 is inserted in a hose body 202, a socket fitting 204 including an inwardly directed collar-like portion 206 is fitted onto the hose body 202. And then, the socket fitting 204 or a sleeve thereof is securely compressed or swaged radially inwardly to the hose body 202. Thereby the hose body 202 along with the socket fitting 204 securely fastened to the connecting pipe 200 with one another and a seal is provided on an end portion of the hose.

However, in case of a hose with a corrugated metal tube in or as an inner layer, sufficient close-contact relation is hardly obtained between the corrugated metal tube and the connecting pipe or the connecting part. If there is a scratch on a surface of the corrugated metal tube in a compressed or swaged range, internal fluid easily leaks out of that scratch.

Therefore, in such a hose with corrugated metal tube, a tip end of the corrugated metal tube is bonded to the connecting pipe or connecting part by welding to assure sealing property therebetween.

However, a great deal of difficulties is presented in welding operation for sealing an end portion of the hose. It not only raises production cost of a hose, but also lowers mechanical strength of the connecting pipe 200 or the corrugated metal tube due to affection by heat during welding and thereby will be a factor to damage quality assurance of the hose.

In case that welding is adapted for bonding and sealing in a hose including a corrugated metal tube, if the corrugated metal tube is vibrated, bent, or is internally subject to pressure, a stress is repeatedly concentrated in a weld-bonded area between an end portion of the connecting pipe 200 and the corrugated metal tube. The connecting pipe 200 is rigid and inflexible while the corrugated metal tube is flexible, and there is a problem that the weld-bonded area or the corrugated metal tube is likely broken.

Once the corrugated metal tube or the weld-bonded area is broken in that way, a hose with corrugated metal tube looses a gas barrier property. In some cases, properties of the hose such as flexibility and vibration absorbability are deteriorated and the hose will be unusable.

The above are described with reference to a hose for conveying hydrogen gas used in a fuel cell as example. The similar problems are anticipated in common to any hoses. For example, it may be the case that a hose with corrugated metal tube is employed for conveying fuel gasoline for the purpose to deal with gasoline or the like permeating to an air or for high temperature and high pressure application due to high output power of equipment where low permeation is severely regulated. Or it may be the case that a hose with corrugated metal tube is employed to convey carbon dioxide ($CO_2$) as refrigerant fluid, which is low in amount of particles just like hydrogen and has high gas permeation. Further, it may be any other case that a hose with corrugated metal tube is applied in fields under severe regulations against gas permeation.

It is an object of the present invention to provide a hose connecting structure for a hose with corrugated metal tube to settle the problems described above.

SUMMARY OF THE INVENTION

In order to achieve a foregoing object, there is provided a novel hose connecting structure for connecting a hose with corrugated metal tube to a mating pipe via a connecting pipe.

The hose connecting structure according to the present invention comprises a hose body having a corrugated metal tube as an inner layer, and an outer layer circumscribing radially outer side thereof. A leading end side of the corrugated metal tube extends axially so as to be exposed out of the outer layer. The hose connecting structure further comprises a socket fitting fitted on an outer surface of an axial end portion of the hose body, and a connecting pipe. The hose body is fixedly secured to the connecting pipe on an a end portion thereof by securely compressing or swaging the socket fitting radially inwardly. The connecting pipe has a tip-end inner surface as all inner abutment surface flaring axially outwardly. The connecting structure also comprises a mating pipe and a fastening member or unit. The mating pipe has an outer abutment surface formed in a shape conforming to the inner abutment surface of the connecting pipe. The fastening member fastens the connecting pipe to the mating pipe axially so that the inner abutment surface of the connecting pipe abuts the outer abutment surface of the mating pipe. The inner abutment surface and the outer abutment surface are in abutment relation with one another via an end portion of the leading end side of the corrugated metal tube or so as to clamp the end portion of the leading end side of the corrugated metal tube. The leading end side of the corrugated metal tube extends along an inner surface of the connecting pipe. The end portion of the corrugated metal tube is formed in a flared portion flaring corresponding to the inner abutment surface.

The fastening member may be a screw-thread fastener or a screw fastener.

Further, the screw-tread fastener may be mounted on either one of the connecting pipe or the mating pipe, and a threaded portion or threads corresponding to the screw-thread fastener may be formed on the other.

And a rigid pressure support pipe or compressive load support pipe may be inserted for bearing or supporting securely compressing or swaging force or strength by the socket fitting within an inner surface of the corrugated metal tube in an axial position corresponding to the socket fitting.

The socket fitting may have a radially inwardly directed collar-like portion. The connecting pipe may be formed separately from the socket fitting and may be formed with a fit-engagement groove on a radially outer surface at an axial position corresponding to the radially inwardly directed collar-like portion of the socket fitting. The connecting pipe and the socket fitting are firmly secured each other by fitting the collar-like portion of the socket fitting in or engaging the collar-like portion with the fit-engagement groove when the socket fitting is securely compressed or swaged to the hose body.

According to the present invention, a good seal may be provided on an end portion of the hose with corrugated metal tube, specifically, a connected portion between the hose and the mating pipe without welding operation. Hence, according to the present invention, welding operation may be completely eliminated during production of a hose or connecting a hose to the mating pipe. At the same time, such problem is solved as repeated stress concentration on a welded portion due to vibration, bending or internal pressure load causes breakage of a hose. Further, as welding procedure is eliminated, a hose may be manufactured easier and its production cost may be lowered. Furthermore, as an inner surface of the flared portion of the corrugated metal tube is forced to contact against the outer abutment surface of the mating pipe under fastening force by a fastening member, a sealing property is ensured.

A screw-thread fastener may be adapted for the fastening member so that the connecting pipe and the mating pipe are connected each other by means of screw-threads. This configuration makes it easier to connect the connecting pipe, i.e., the hose with corrugated metal tube to the mating pipe.

Also, a rigid pressure support pipe or compressive load support pipe may be inserted within an inner surface of the corrugated metal tube on an axial position corresponding to the socket fitting. In this arrangement, the pressure support pipe bears securely compressing or swaging force when the socket fitting is securely compressed, swaged or clamped radially inwardly. Such arrangement enables the pressure support pipe and the socket fitting to firmly secure an end portion of the hose body, and may enhance securing strength between the socket fitting and the hose body, and further between the hose body and the connecting pipe.

Further, the connecting pipe may be formed separately from the socket fitting. However, to reiterate, the connecting pipe may be provided with the fit-engagement groove on an outer surface thereof, and the connecting pipe and the socket fitting may be constructed so as to be secured each other by fitting the collar-like portion of the socket fitting in the fit-engagement groove in engagement relation when the socket fitting is securely compressed or swaged to the hose body. That is to say, the socket fitting and the connecting pipe are secured each other firmly in unitary relation by physical engagement between the collar-like portion and the fit-engagement groove.

Now, the preferred embodiments of the present invention will be described in detail with reference to the drawings.

DETAILED DESCRIPTIONS OF PREFERRED EMBODIMENTS

Figure 1:
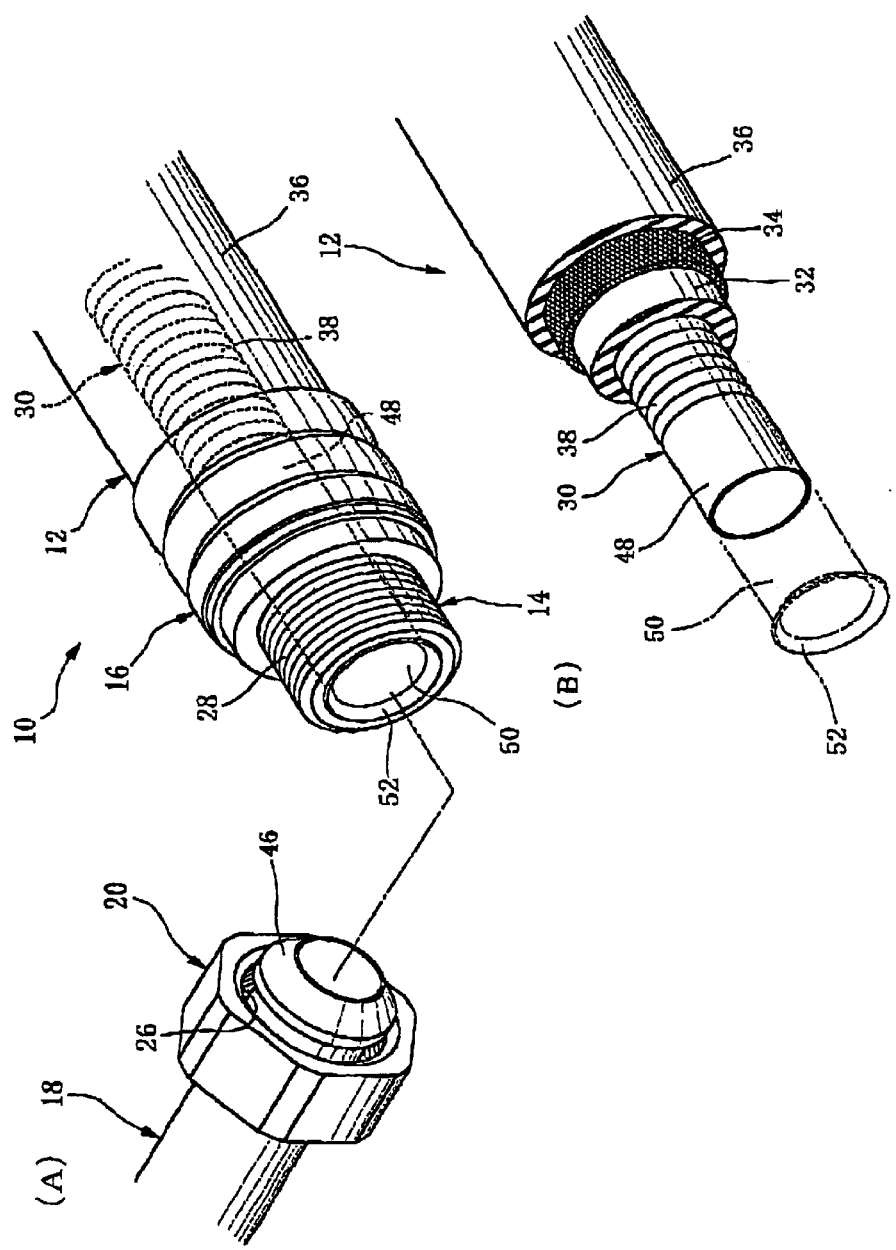
FIG. 1(A) is a perspective view showing a mating pipe and a hose with corrugated metal tube to be connected thereto.
FIG. 1(B) is a perspective view showing multi-layer construction of the hose with corrugated metal tube.
Figure 2:
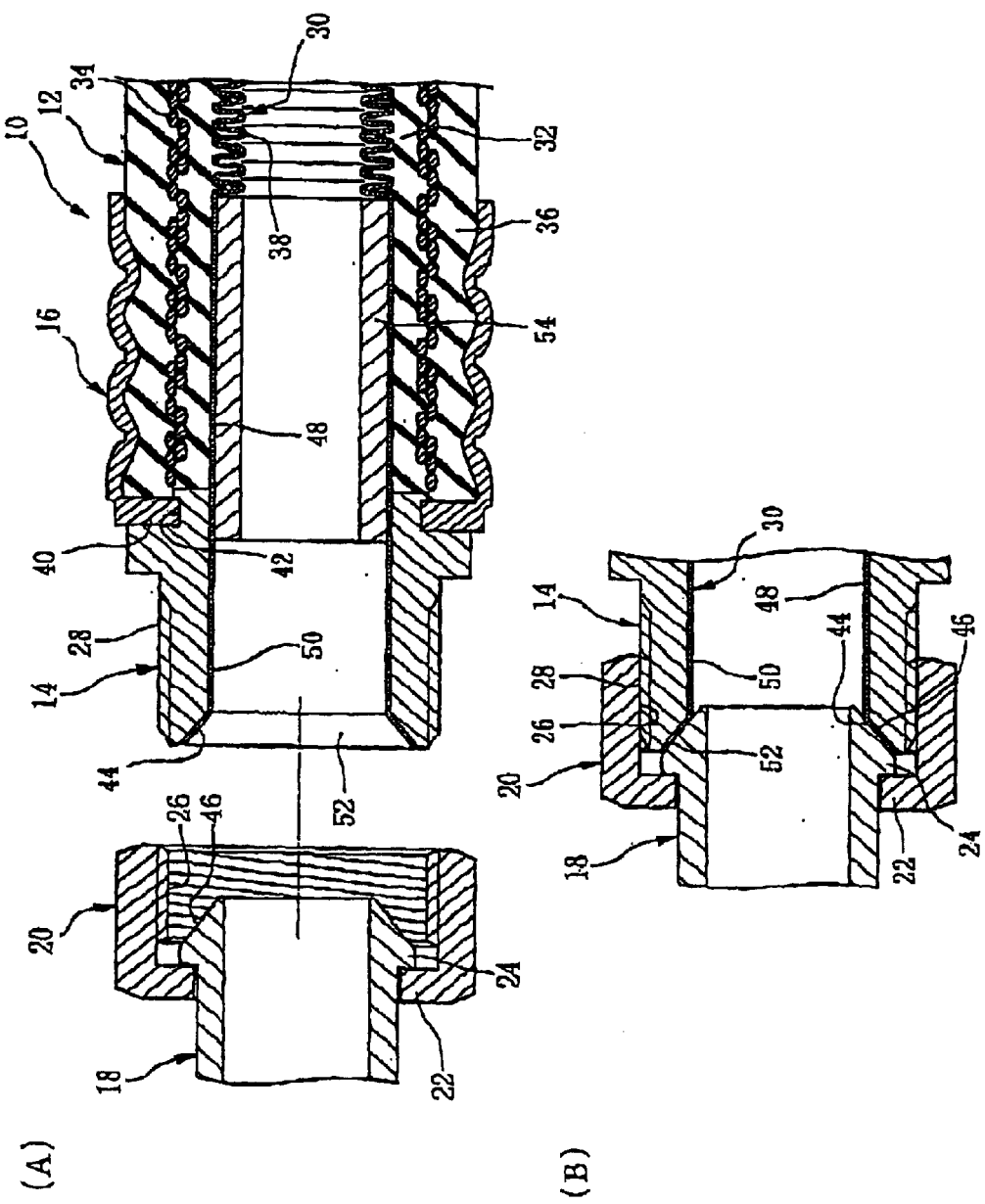
FIG. 2(A) is a cross-sectional view showing the mating pipe and the hose with corrugated metal tube to be connected thereto.
FIG. 2(B) is a cross-sectional view showing a hose connecting structure for the hose with corrugated metal tube according to the present invention.

In FIGS. 1 and 2, a numeral reference 10 indicates a hose with corrugated metal tube (hereineafter referred to as a hose) which is preferably adapted for hydrogen or hydrogen gas conveying hose, refrigerant conveying hose for air conditioners, automobile fuel conveying hose or the like. A numeral reference 12 indicates a hose body, a numeral reference 14 a metallic connecting pipe fixed to the hose body 12, a numeral reference 16 a metallic socket fitting fitted onto or on an outer surface of the hose body 12. The socket fitting 16 is securely compressed or swaged to the hose body 12 and thereby the connecting pipe 14 is, along with the socket fitting 16, fixedly secured to the hose body 12.

A numeral reference 18 indicates a metallic mating pipe to be mated with the hose 10. The hose 10 or the hose body 12 is connected to the metallic mating pipe 18 by means of the connecting pipe 14. A numeral reference 20 indicates a cap nut or hexagon cap nut as a screw-thread fastener which fastens the connecting pipe 14 and the mating pipe 18 with one another in an axial direction.

As shown in FIG. 2, the cap nut 20 has a radially inwardly directed annular engagement portion 22 and is mounted or fitted on the pipe 18. The engagement portion 22 engages with an annular stop portion 24 which is formed to direct radially outwardly on an end portion of the mating pipe 18, and thereby the cap nut 20 is mechanically locked with respect to the mating pipe 18.

More particularly, screw-fastening force by means of the cap nut 20 is intended to act on the mating pipe 18 via the engagement portion 22 and the stop portion 24.

The cap nut 20 is formed with internal threads 26 on an inner surface thereof, while the connecting pipe 14 is formed with external threads 28 on an outer surface thereof corresponding to the internal threads 26 of the cap nut 20. The internal threads 26 of the cap nut 20 are screwed on the external threads 28 of the connecting pipe 14 and thereby a screw-thread engagement is provided therebetween. The screw-thread engagement of the internal threads 26 and the external threads 28 fastens firmly the connecting pipe 14 and the mating pipe 18 each other in an axial direction.

As shown in FIG. 2, the hose body 12 has a corrugated metal tube 30 as an innermost layer and multi-layers, an inner elastic layer 32, a reinforced layer 34 as an intermediate layer and an outer elastic layer 36 which circumscribe an outer side of the corrugated metal tube 30. The reinforced layer 34 also has certain elasticity. Each of the layers is fixedly bonded in unitary relation to an adjacent layer into a composite hose by vulcanizing or other manner.

In this embodiment, the inner elastic layer 32, the reinforced layer 34 and the outer elastic layer 36 construct outer layer circumscribing the corrugated metal tube 30.

The reinforced layer 34 may be a wire-reinforced layer or a fiber-reinforced layer.

And the inner elastic layer 32 may be made of rubber or resin having elasticity while the outer elastic layer 36 may be a layer made of rubber.

On the other hand, the corrugated metal tube 30 as an innermost layer is formed with corrugations 38 for generally entire axial length thereof, which provides the corrugated metal tube 30 with flexibility.

That is, although, in this embodiment, an innermost layer of the hose 10 includes a metal tube, the hose 10 is provided entirely with flexibility, thanks to the corrugations 38 formed on the metal tube.

The corrugated metal tube 30 may be made of materials such as steel products including stainless steel, copper, copper alloy, aluminum, aluminum alloy, nickel, nickel alloy, titanium or titanium alloy, and preferably may be made of stainless steel.

A wall thickness of the corrugated metal tube 30 may be from 20 to 500 µm, preferably is minimum 50 µm in view of preventing defects such as pinholes and further in view of processing of the corrugations 38 or the like, and maximum 300 µm in view of flexibility and durability.

The socket fitting 16 has a sleeve and a radially inwardly directed collar-like portion 40 on an axial end thereof, while the connecting pipe 14 is formed with annular fit-engagement groove 42 at a position axially corresponding to the collar-like portion 40 on a radially outer surface thereof. The collar-like portion 40 or an inner end portion of the collar-like portion 40 fits in and engages with the fit-engagement groove 42 by securely compressing or swaging the socket fitting 16 radially inwardly to the hose body 12. The socket fitting 16 is thereby fixedly secured to the connecting pipe 14 in unitary relation.

The connecting pipe 14 has a tapered inner surface, tapered female surface, inner abutment surface or female abutment surface 44 on a tip end portion thereof which is internally tapered in a direction away from an axial end, in other words, is internally flared axially outwardly.

Correspondingly, the mating pipe 18 has a tapered outer surface, tapered male surface, outer abutment surface or male abutment surface 46 on an outer peripheral surface at a tip end portion thereof which is shaped to conform to the tapered inner surface 44.

The corrugated metal tube 30 has a non-corrugated and axially straight-walled portion, or straight pipe portion 48 on an axial end side.

The corrugated metal tube 30 or the straight-walled portion 48 is configured as an extending portion 50 on a leading end side, which extends along an inner surface of the connecting pipe 14 in an axial direction and is exposed out of the outer layer comprising the inner elastic layer 32, the reinforced layer 34 and the outer elastic layer 36.

And, a tip end portion of the extending portion 50 is formed in a flared portion 52 which flares along the tapered inner surface 44 of the connecting pipe 14, and the flared portion 52 contacts the tapered inner surface 44. In an inner surface side of the straight-walled portion 48 of the corrugated metal tube 30, a rigid pressure support pipe or compressive load support pipe 54, in this instance made of metal, is inserted in a position axially corresponding to the socket fitting 16.

The pressure support pipe 54 bears or support from inside compressing or swaging pressure by the socket fitting 16. That means, an end portion of the hose body 12 is damped under pressure radially inwardly and outwardly in between the socket fitting 16 and the pressure support pipe 54 by securely compressing or swaging operation of the socket fitting 16.

At the same time, while the collar-like portion 40 of the socket fitting 16 fits in and engages with the fit-engagement groove 42 of the connecting pipe 14, and an end portion of the hose body 12 is fixedly secured and fastened to the connecting pipe 14, the socket fitting 16 and the pressure support pipe 54 in unitary relation.

In the hose 10 including an end portion fixedly secured and fastened in unitary relation in this manner, the cap nut 20 is screwed up on the connecting pipe 14, and thereby the hose 10 is connected to the mating pipe 18 in an axial direction by screw-thread fastening construction.

At this time, the tapered outer surface 46 of the mating pipe 18 abuts firmly the tapered inner surface 44 in an axial direction via the flared portion 52 of the corrugated metal tube 30 therebetween under screwing force of the cap nut 20.

That is, the flared portion 52 is clamped firmly under pressure by the tapered outer surface 46 of the mating pipe 18 and the tapered inner surface 44 of the connecting pipe 14, and thereby an inner surface of the flared portion 52 is intimately contact with the tapered outer surface 46 of the mating pipe 18. This intimate contact therebetween provides a good seal between an inner surface of an axial end portion of the corrugated metal tube 30 and an outer surface of the mating pipe 18.

According to the hose connecting structure of the embodiment stated above, an end portion of the hose 10, more concretely, a connected portion between an end portion of the hose 10 and the mating pipe 18 is favorably sealed not by welding. Specifically, fastening force of the cap nut 20 urges a tip end portion of the corrugated metal tube 30 firmly against the tapered outer surface 46 of the mating pipe 18 on an inner surface of the flared portion 52, and thereby a good seal is provided between the corrugated metal tube 80 and the mating pipe 18.

The connecting structure according to this embodiment may solve the problem that stress is repeatedly concentrated on the welded portion between the connecting pipe 14 and an end of the corrugated metal tube 30 by vibration, bending or internal pressure resulting in breakage of the welded portion.

As welding process may be eliminated, it may favor the production of the hose 10 and consequently the production cost thereof may be reduced.

Further, in this embodiment, as the pressure support pipe 54 is inserted in an inner surface side of the corrugated metal tube 30 so as to bear securely compressing or swaging force from an inner surface side thereof when securely compressing or swaging the socket fitting 16, an end portion of the hose body 12 may be tightly fastened. Thereby securing strength between the socket fitting 16 and the hose body 12 is enhanced, and further securing strength between the socket fitting 16 or the hose body 12 and the connecting pipe 14 is enhanced.

Furthermore, in this embodiment, the connecting pipe 14 is provided separately from the socket fitting 16. However, the connecting pipe 14 is formed with the fit-engagement groove 42 so that the collar-like portion 40 of the socket fitting 16 fits in and engages with the fit-engagement groove 42 when securely compressing or swaging the socket fitting 16 to the hose body 12. Therefore, the connecting pipe 14 and the socket fitting 16 are thereby firmly secured in mechanical engagement relation with one another in unitary relation.

Figure 3:
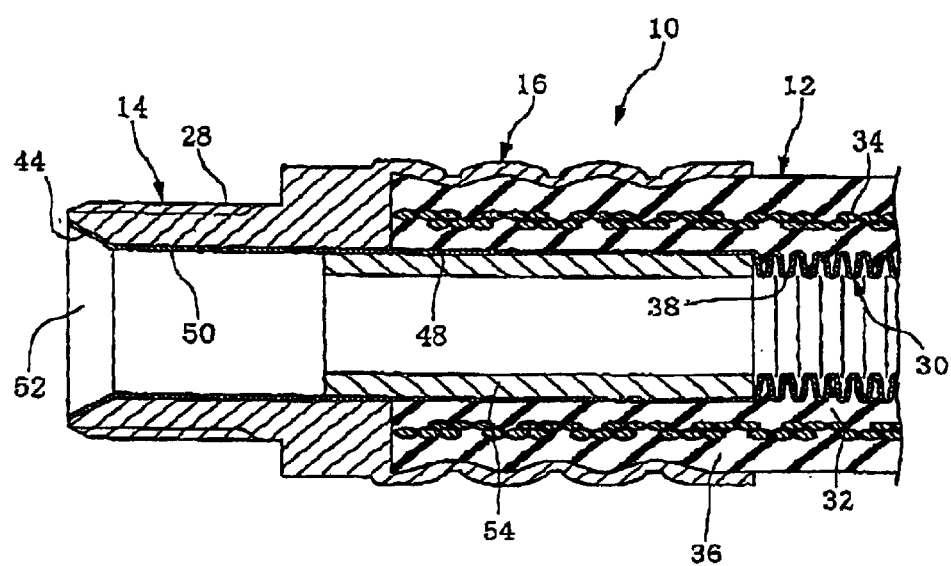
FIG. 3 is a cross-sectional view showing a relevant part of another hose connecting structure according to the present invention.

Although the connecting pipe 14 and the socket fitting 16 are provided separately in the aforementioned embodiment, the connecting pipe 14 may be formed integrally with the socket fitting 16 as shown in FIG. 3.

Figure 4:
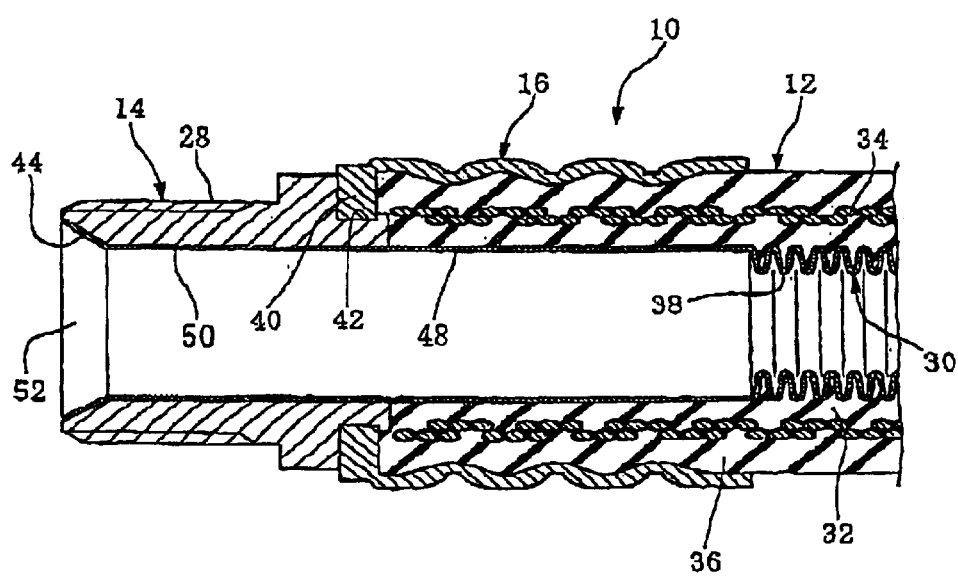
FIG. 4 is a cross-sectional view showing a relevant part of yet another hose connecting structure according to the present invention.

In yet another embodiment according to the present invention as shown in FIG. 4, an end portion of the hose 10 is configured without the pressure support pipe 54 as disclosed in the aforementioned embodiments.

Figure 5:
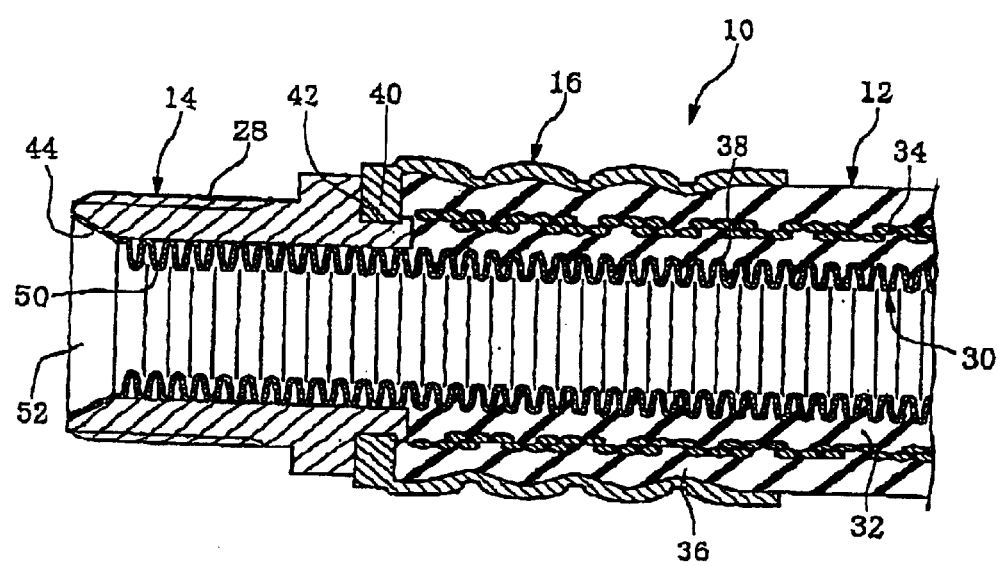
FIG. 5 is a cross-sectional view showing a relevant part of further hose connecting structure according to the present invention.
Figure 6:
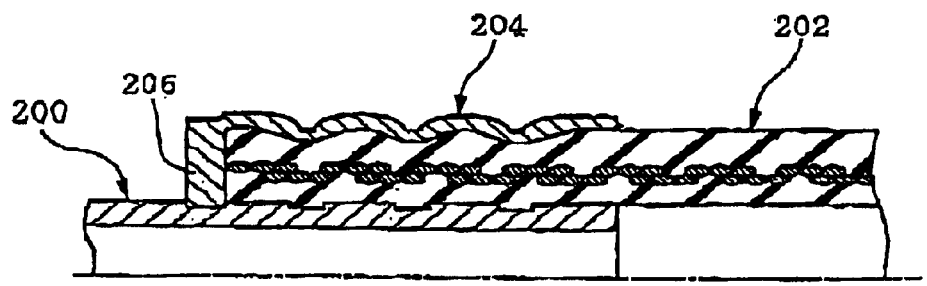
FIG. 6 is a descriptive view explaining a conventional hose connecting structure.

In further embodiment according to the present invention as shown in FIG. 5, the corrugations 38 are formed on the corrugated metal tube 30 further up to an axial end side thereof so as to define the extending portion 50.

And the flared portion 52 of the same configuration as above is formed on an tip end portion of the extending portion 50 extending along an inner surface of the connecting pipe 14 and exposed out of outer layer of the hose body 12.

The embodiments showed in FIGS. 3 to 5 are the same as the embodiment shown in FIGS. 1 and 2 in that the connecting pipe 14 is fastened to the mating pipe 18 in an axial direction by means of the cap nut 20.

And, in the embodiments shown in FIGS. 4 and 5, the connecting pipe 14 is formed with the annular fit-engagement groove 42 while the socket fitting 16 is provided with the radially inwardly directed collar-like portion 40 which fits in and engages with the fit-engagement groove 42.

Although the preferred embodiments have been described above, these are only some of embodiments of the present invention.

In the aforementioned embodiments, the connecting pip 14 is formed with external threads 28, and the cap nut 20 as a screw-thread fastener is mounted on the mating pipe 18. Then the cap nut 20 is screwed on the external threads 28, and thereby the connecting pipe 14 and the mating pipe 18 are connected with one another in screw-thread engagement relation, However, for example, external threads may be formed on an outer surface of the mating pipe 18 and a cap nut may be mounted on the connecting pipe 14, and the cap nut is screwed on the external threads. Thereby the connecting pipe 14 may screw-threadably engage with the mating pipe 18. Or, the screw thread fastener may be replaced with any other fastening member.

Moreover, the present invention may be adapted for various types of fluid conveying hose, other than the ones as in the above embodiments. Such variations are intended to be within the scope of the present invention and the appended claims.

We claim:

1. A hose connecting structure for connecting a hose with corrugated metal tube to a mating pipe comprising:

a hose body having a corrugated metal tube as inner layer and an outer layer circumscribing radially outer side thereof, a leading end side of the corrugated metal tube extending axially so as to be exposed out of the outer layer, a socket fitting fitted on an outer surface of an axial end portion of the hose body, a connecting pipe to which an axial end portion of the hose body is fixedly secured by securely compressing or swaging the socket fitting radially inwardly, the connecting pipe having a tip-end inner surface as an inner abutment surface flaring axially outwardly, a mating pipe having an outer abutment surface formed in a shape conforming to the inner abutment surface of the connecting pipe, and a fastening member fastening axially the connecting pipe to the mating pipe so that the inner abutment surface of the connecting pipe abuts the outer abutment surface of the mating pipe, the inner abutment surface and the outer abutment surface clamping the end portion of the leading end side of the corrugated metal tube which extends along an inner surface of the connecting pipe, the end portion of the corrugated metal tube being formed in a flared portion flaring corresponding to the inner abutment surface of the connecting pipe.

2. A hose connecting structure for connecting a hose with corrugated metal tube as set forth in claim 1, wherein the fastening member is a screw fastener.

3. A hose connecting structure for connecting a hose with corrugated metal tube as set forth in claim 2, wherein the fastening member is mounted on either one of the connecting pipe or the mating pipe, and a threaded portion corresponding to the fastening member are formed on the other.

4. A hose connecting structure for connecting a hose with corrugated metal tube as set forth in claim 1, further comprising: a rigid pressure support pipe inserted for bearing securely compressing or swaging force by the socket fitting within an inner surface of the corrugated metal tube in an axial position corresponding to the socket fitting.

5. A hose connecting structure for connecting a hose with corrugated metal tube as set forth in claims 1, further comprising:

a radially inwardly directed collar-like portion formed on the socket fitting, and a fit-engagement groove provided on a radially outer surface of the connecting pipe at an axial position corresponding to the radially inwardly directed collar-like portion, the connecting pipe and the socket fitting being firmly secured each other by the collar-like portion of the socket fitting fitted in the fit-engagement groove when the socket fitting is securely compressed or swaged on the hose body.

* * * * *

UNITED STATES PATENT AND TRADEMARK OFFICE
CERTIFICATE OF CORRECTION

PATENT NO. : 6,866,302 B2
DATED : March 15, 2005
INVENTOR(S) : Norihiko Furuta

It is certified that error appears in the above-identified patent and that said Letters Patent is hereby corrected as shown below:

<u>Title page,</u>
Item [75], Inventor, should read as follows:
-- Norihiko Furuta, Aichi-ken (JP) --.

Signed and Sealed this

Fourth Day of October, 2005

JON W. DUDAS
*Director of the United States Patent and Trademark Office*